(12) United States Patent  (10) Patent No.: US 7,912,126 B2
Jahanghir et al.  (45) Date of Patent: Mar. 22, 2011

(54) SYSTEMS AND METHODS FOR IMPROVED MOTION ESTIMATION

(75) Inventors: Musa Jahanghir, Palo Alto, CA (US); Munsi Haque, San Jose, CA (US); Louis A. Lippincott, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 1665 days.

(21) Appl. No.: 11/171,805

(22) Filed: Jun. 30, 2005

(65) Prior Publication Data

US 2007/0002951 A1    Jan. 4, 2007

(51) Int. Cl.
*H04N 7/18* (2006.01)
(52) U.S. Cl. .............. 375/240.16; 375/240.17
(58) Field of Classification Search . 375/240.01–240.29
See application file for complete search history.

(56) References Cited

U.S. PATENT DOCUMENTS 7,782,959 B2 * 8/2010 Kondo et al. ............ 375/240.26

* cited by examiner

*Primary Examiner* — Andy S Rao
(74) *Attorney, Agent, or Firm* — Buckley, Maschoff & Talwalkar LLC (57) ABSTRACT

System or methods may include loading information associated with a window of pixels from memory into a matrix of processing elements, the window of pixels being selected from a plurality of pixels associated with a reference frame, determining a current frame comprising a plurality of pixels, determining a first block of pixels from the plurality of pixels of the current frame, comparing each pixel of the first block of pixels to each pixel of the window of pixels by comparing the first block of pixels to portions of the window of pixels in an exhaustive manner, wherein comparing comprises calculating a first deviation result for each pair of compared pixels and aggregating the first deviation results for each position of the first block of pixels in the window of pixels, the calculating being performed by the matrix of processors.

22 Claims, 6 Drawing Sheets

SYSTEMS AND METHODS FOR IMPROVED MOTION ESTIMATION

BACKGROUND

Image information (such as digital video information) is often transmitted from one electronic device to another. Such information is typically encoded and/or compressed to reduce the bandwidth required for transmission and/or to decrease the time necessary for transmission. In some configurations, information about differences between a current picture and a previous picture might be transmitted and the device receiving the image information may then, for example, decode and/or decompress the information (e.g., by using the previous picture and the differences to generate the current picture) and provide the image to a viewing device.

Figure 1:
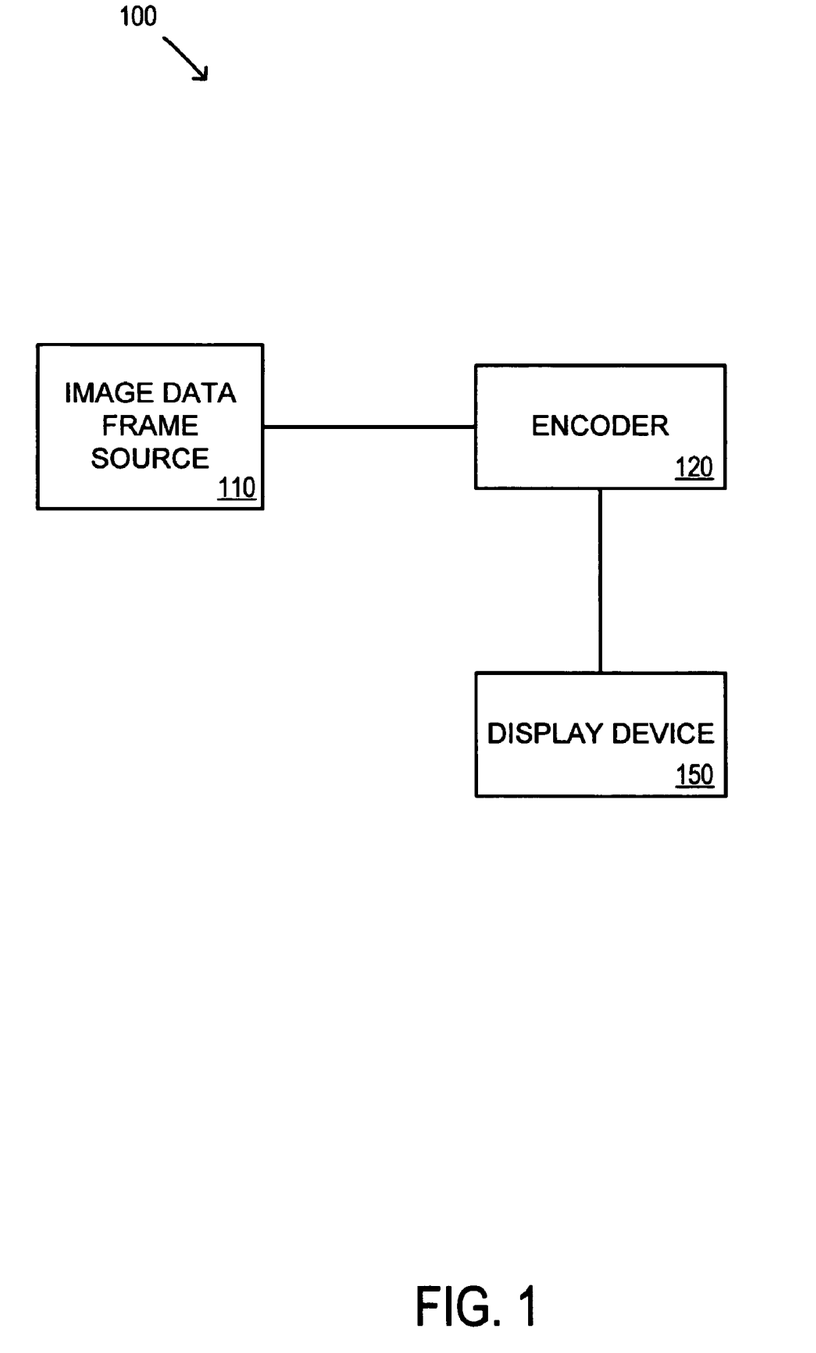
FIG. 1 is a block diagram of a system.

As represented by a block diagram of a system 100 as shown in FIG. 1, for example, an image data frame source 110 may be coupled to provide image data frames to an encoder 120. The encoder 120 may, according to some configurations, apply an encoding and/or compression algorithm in accordance with the Moving Pictures Expert Group (MPEG) Release Two (MPEG-2) 13818 standard (1994) published by the International Standards Organization (ISO) and the International Electrotechnical Commission (IEC), and/or in accordance with the MPEG-4 14496 (1999/2002) standard published by ISO/IEC. The encoder 120 may, for example, utilize motion compensation procedures to allow image frames to be constructed based on previous (and/or future) frames. The encoded and/or compressed information may then be sent to a display device 150. The display device 150 may comprise, for example, a decoder (not separately shown) that may decode and/or decompress the image information for display via the display device 150.

Figure 2:
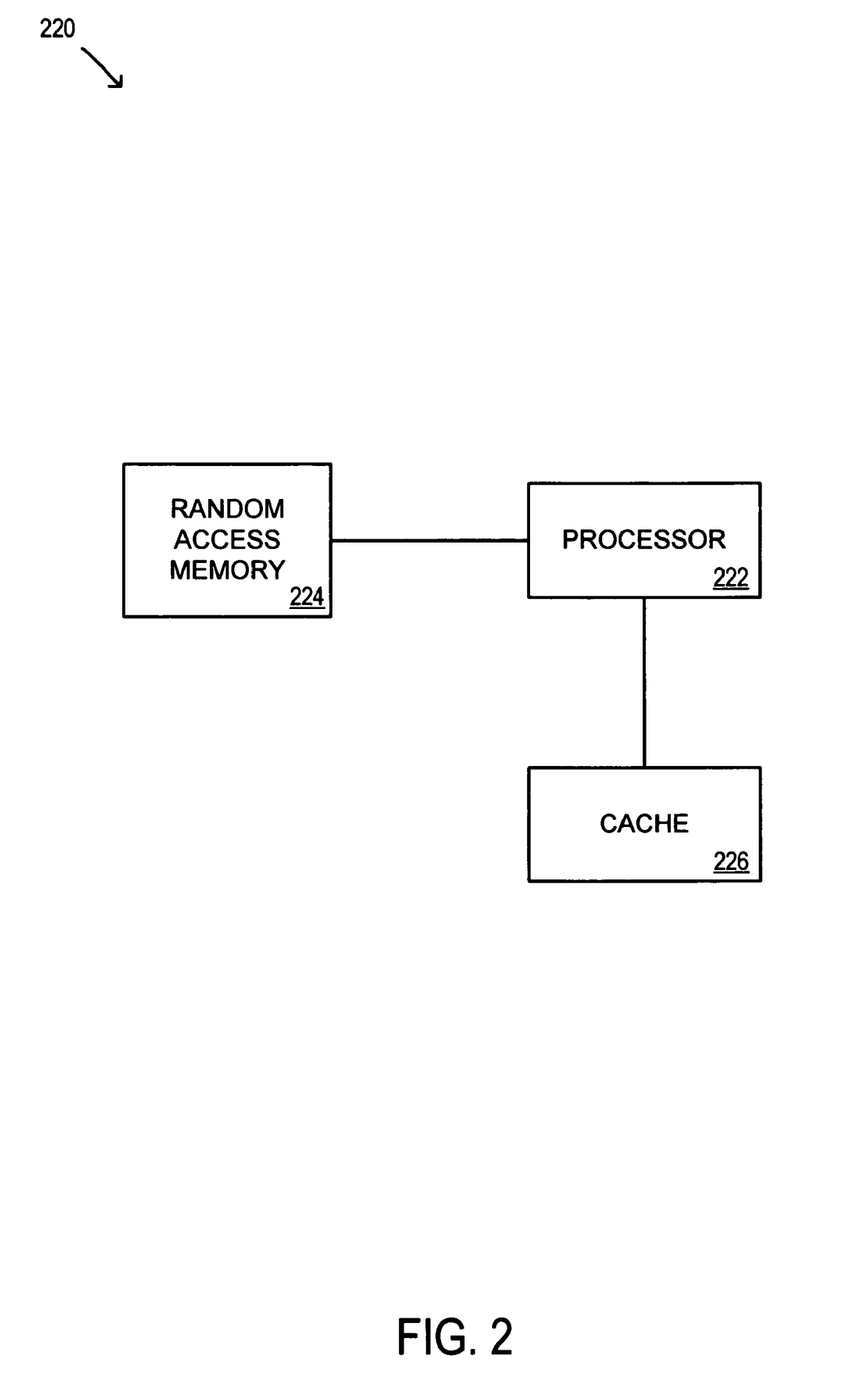
FIG. 2 is a block diagram of an encoder.

Referring to FIG. 2, a block diagram of an encoder 220 is shown. The encoder 220 may, for example, be similar in configuration and/or functionality to the encoder 120 described in conjunction with FIG. 1. In some configurations, the encoder 220 may include a processor 222, a random access memory (RAM) 224, and/or a cache 226. The processor 222 may, for example, load information associated with reference image frames from the RAM 224 and/or into the cache 226. The reference frame information may then be compared to information from a current frame to estimate motion in the image sequence. One of the most common and effective ways to estimate motion is accomplished using a block-matching algorithm (BMA). A current image frame may, for example, be segmented into blocks of image pixels having pixel dimensions of N×N. Block sizes of 4×4, 4×8, 8×4, 8×8, 8×16, 16×8, and 16×16 (commonly referred to as a "macroblock") may typically be used.

For each block of the current image, the block is compared to the reference frame to determine the most likely location of the block in the reference frame. To reduce computational overhead, a search window within the reference frame is often identified and the block is compared to various positions within the search window. The search window may, for example, comprise dimensions of (2W+N)×(2W+N), where W is a maximum assumed and/or allowable displacement of the block between frames. The most effective yet computationally intensive way of comparing the block to the search window is to compare the pixels of the block to the pixels of the search window at every position that the block may be moved to within the search window. This is referred to as a "full" or "exhaustive" search. For each position of the block tested within the search window, each pixel of the block is compared to a corresponding pixel in the search window. The comparison comprises computing a deviation between the values of compared pixels.

Often the mathematical sum of absolute differences (SAD), mean squared error (MSE), mean absolute error (MSE), or mean absolute difference (MAD) functions are utilized to quantitatively compare the pixels. The deviations for each block position are then accumulated, and the position within the search window that yields the smallest deviation is selected as the most likely position of the block in the previous frame. The differences in the current and previous positions of the block are then utilized to derive a motion vector to estimate the movement associated with the block between the reference frame and the current frame. The motion vector may then, for example, be transmitted as image information (e.g., instead of a full image frame) so that a decoder may render, recreate, or build the current frame by simply applying the motion vector information to the reference frame.

Even when an exhaustive search is not performed (e.g., various "fast" search algorithms have been proposed and/or used), however, the motion estimation process may often be the most memory-intensive component of image transmission. For every block comparison and/or for every block position in the reference frame search window, for example, the processor 222 may need to load the reference frame information into the cache 226. When upwards of one billion operations are performed per second, this memory traffic may be the limiting factor in image transmission performance and may otherwise be highly undesirable.

DETAILED DESCRIPTION

Some embodiments described herein are associated with "processing elements". As used herein, the term "processing element" may generally refer to any electronic device or component that is capable of processing signals. Processing elements may, according to some embodiments, comprise discrete or simplistic processing devices capable of performing only simple mathematical operations. Each processing element may, for example, be limited in design or configuration to only be capable of performing simple arithmetic operations (e.g., addition, subtraction, multiplication and/or division). Processing elements may also or alternatively comprise a typical processor and/or a portion or portions thereof. In some embodiments, processing elements may be coupled to define an "array" or a "matrix". As used herein, the terms "array" and "matrix" may be used interchangeably and may generally refer to any plurality of processing elements that are coupled and/or that are otherwise in communication. A matrix of processing elements may, for example, comprise a plurality of simplistic computational devices coupled via a plurality of data flow paths. In some embodiments, the data flow paths may be configured to pass particular data elements in a particular manner amongst the processing elements.

Figure 3:
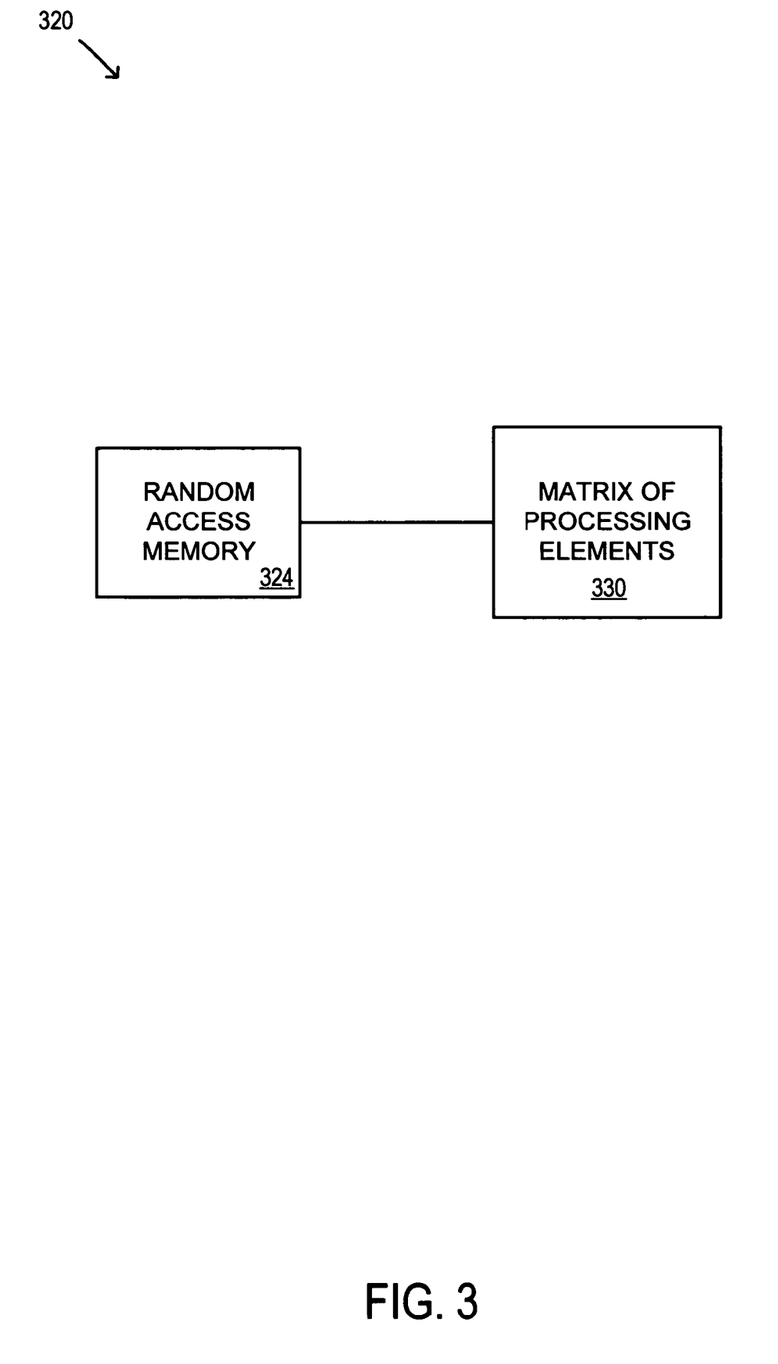
FIG. 3 is a block diagram of an encoder according to some embodiments.

Referring now to FIG. 3, a block diagram of an encoder 320 according to some embodiments is shown. The various systems and apparatus described herein are depicted for use in explanation, but not limitation, of described embodiments. Different types, layouts, quantities, and configurations of any of the systems or apparatus described herein may be used without deviating from the scope of some embodiments. Fewer or more components than are shown in relation to the systems or apparatus described herein may be utilized without deviating from some embodiments.

According to some embodiments (such as shown in FIG. 3), the encoder 320 may comprise RAM 324 coupled to a matrix of processing elements 330. The matrix of processing elements 330 may, for example, retrieve reference image frame information from the RAM 324 to utilize in implementing a motion estimation algorithm. In some embodiments, the encoder 320 may be configured to be capable of performing motion estimation computations without requiring other memory stores such as the cache 226 described in conjunction with FIG. 2. The matrix of processing elements 330 may, for example, be capable of performing all or substantially all necessary calculations (and/or storage) without requiring cache and/or without requiring reference frame information to be reloaded from the RAM 324. In some embodiments, the matrix of processing elements 330 may comprise thousands of processing elements coupled via a plurality of data flow paths. The matrix of processing elements 330 may, for example, be configured to receive reference frame information from the RAM 324 and load the reference frame information into the matrix of processing elements 330.

According to some embodiments, the matrix of processing elements 330 may comprise a processing element for every pixel of the reference frame search window. For a one hundred and twenty-eight by thirty-two pixel search window, for example, four thousand and ninety six processing elements may be included in the matrix of processing elements 330. Each pixel of the search window may, for example, be loaded into the matrix of processing elements 330 (described elsewhere herein). The current block pixels may then, according to some embodiments, be passed through the matrix of processing elements 330 until all necessary and/or desired computations are complete. In some embodiments, the processing elements may also or alternatively be group in accordance with block sizes utilized to perform an exhaustive motion search. The matrix of processing elements 330 may, for example, comprise a plurality of groups of four processing elements (e.g., a quad of processing elements) configured to simultaneously receive four pixels of a current block to be compared to the search window information already loaded into the processing elements. According to some embodiments, individual processing elements may calculate Sum of Absolute Difference (SAD) metrics for each corresponding pixel of the reference frame compared to each pixel of the current block, while the group of processing elements may be utilized to determine a minimum SAD for the entire group. According to some embodiments, the minimum SAD metrics for various groups of processing elements may be utilized to determine a current block size that is associated with a minimum aggregated SAD amount (e.g., an 8×4 versus a 4×8 current block having a smaller associated minimum aggregated SAD amount).

Figure 4:
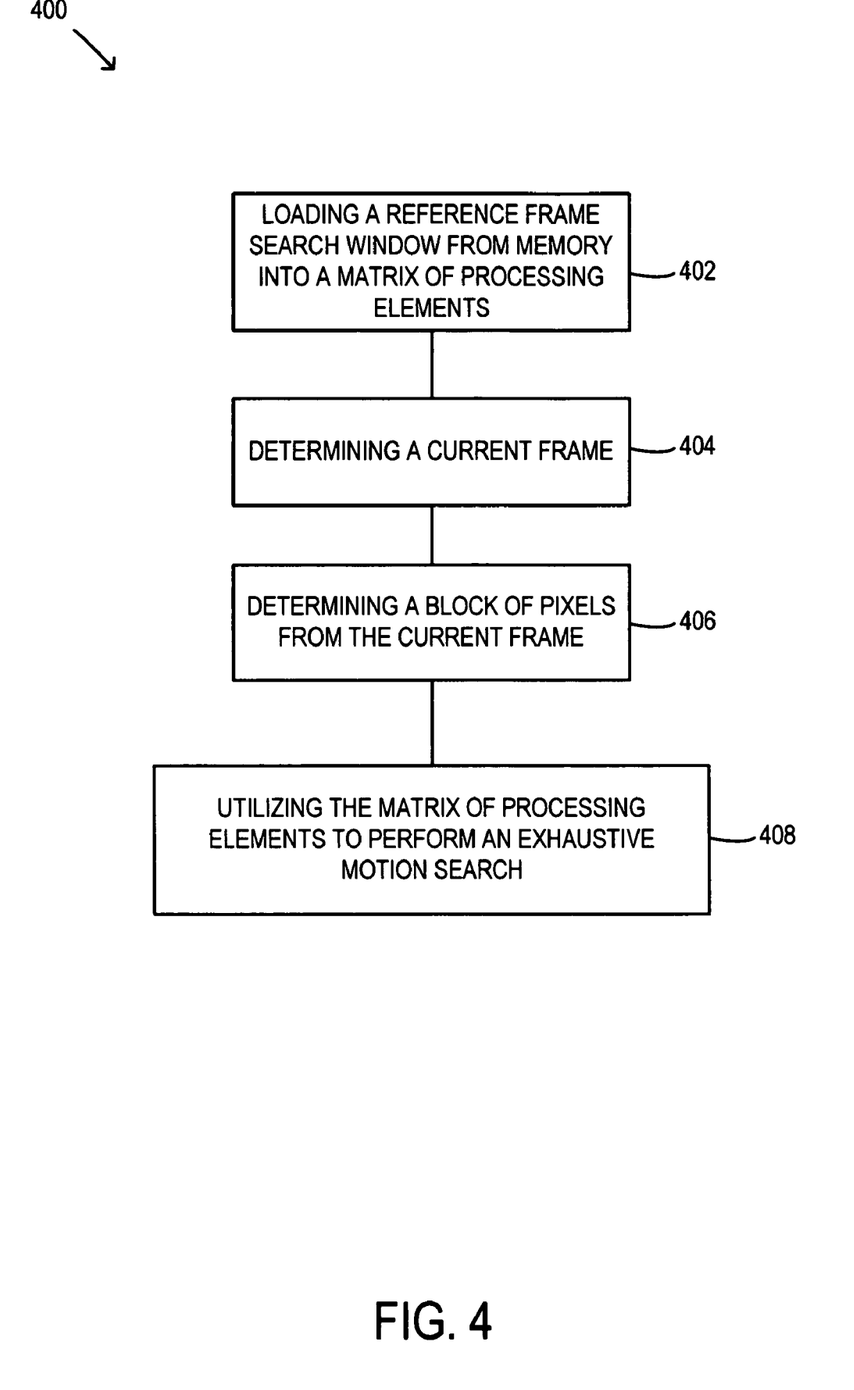
FIG. 4 is flow diagram of a method according to some embodiments.

Turning to FIG. 4, for example, a method 400 according to some embodiments is shown. The method 400 may, according to some embodiments, be performed by and/or otherwise associated with the encoder 320 and/or the matrix of processing elements 330 described in conjunction with FIG. 3. The flow diagrams described herein do not necessarily imply a fixed order to the actions, and embodiments may be performed in any order that is practicable. Note that any of the methods described herein may be performed by hardware, software (including microcode), firmware, manual means, or any combination thereof. For example, a storage medium may store thereon instructions that when executed by a machine result in performance according to any of the embodiments described herein.

In some embodiments, the method 400 may begin at 402 by loading a reference frame search window from memory into a matrix of processing elements (such as the matrix of processing elements 330). The reference frame search window may comprise, for example, information associated with a window of pixels within a reference image frame. The search window information may, according to some embodiments, comprise quantitative information associated with the pixels within and/or comprising the search window. In some embodiments, the search window information may be loaded from a working memory such as the RAM 324 of the encoder 320. In accordance with some embodiments, the search window information may only need to be loaded once to conduct the method 400. In some embodiments, each pixel of the reference frame search window may be loaded into a processing element of the matrix of processing elements. Various pieces or portions of the search window information may, for example, be piped into various data flow paths leading into the matrix of processing elements. According to some embodiments, each processing element of the matrix of processing elements may be loaded with a pixel from the search window of the reference frame. In such a manner, for example, cache and/or other memory is not required to store the reference frame information loaded from memory.

The method 400 may continue, according to some embodiments, by determining a current frame at 404. A current image frame to be processed, for example, may be identified, loaded, and/or otherwise determined. In some embodiments, information associated with the current frame may also or alternatively be piped into the data flow paths associated with the matrix of processing elements. At 406, for example, the method 400 may continue by determining a block of pixels from the current frame. The block of pixels may, according to some embodiments, be passed via one or more data flow paths into the matrix of processing elements. Various data flow paths may, for example, be configured to pass both reference frame search window information as well as current block information to one or more processing elements of the matrix of processing elements. In some embodiments, different data flow paths may be utilized to load the search window information into the processing elements than are utilized to pass the current block information through the matrix of processing elements. According to some embodiments, each processing element may be configured to compare the loaded search window information to every pixel of the current block that is passed through the processing element.

The method 400 may continue at 408, for example, by utilizing the matrix of processing elements to perform an exhaustive motion search. Each pixel of the current block may, according to some embodiments, be compared to each potential corresponding pixel within the reference frame search window. The data flow paths may be configured, for example, to load the reference frame information into the processing elements and then pass the current block information through the matrix of processing elements to calculate and/or accumulate the SAD deviations between pixels. In some embodiments, utilization of a large number of processing elements (e.g., capable of performing only simplistic mathematical operations) may permit all or substantially all necessary motion estimation calculations and/or accumulations to be performed utilizing the single load of reference frame information from memory. In other words, the utilization of the matrix of processing elements may dramatically reduce the memory bandwidth and/or overhead required to perform even an exhaustive motion search.

In some embodiments, the matrix of processing elements and/or the manner in which they are coupled via the data flow paths may provide other advantages. The block size chosen for the exhaustive search (4×4, 16×16, etc.) may, for example, be compared to the search window and then the block size may be changed and re-compared to the search window, without requiring additional memory traffic. In some embodiments, various block sizes may be analyzed without requiring any additional SAD calculations. The block size may even be iterated (e.g., through the seven typical block sizes) to determine the most appropriate block size to utilize to estimate motion, without requiring the reference window information to be loaded from memory (e.g., into the processing elements) more than once and/or without requiring additional SAD calculations. In the case that the matrix of processing elements comprises approximately four thousand and ninety-six simple computational devices (e.g., to load every pixel of a two hundred and fifty-six by thirty-two pixel search window), for example, an exhaustive search of every desirable block size may be executed, while creating significantly less memory traffic than previous methods and/or systems. One pass of current block information through the processing elements having the reference window information, for example, may calculate and aggregate all SAD metrics for each 4×4 current block (e.g., associated with a quad of processing elements). The various 4×4 current block SAD metrics may then be utilized, according to some embodiments, to determine combinations of 4×4 current blocks (e.g., two 4×4 blocks comprising an 8×4 current block) that are associated with minimum aggregated SAD amounts. In such a manner, for example, various current block sizes may be analyzed without requiring further SAD calculations and/or without requiring further memory traffic.

According to some embodiments, utilization of the matrix of processors to perform the exhaustive search may also or alternatively consume significantly less power (e.g., as in terms of Watts) than previous systems or methods. The reduction in required memory bandwidth and/or traffic may, for example, reduce the power consumed to perform the exhaustive search by around one hundred to upwards of one thousand times. The matrix of processing elements may also or alternatively facilitate smaller motion searching system sizing. The plurality of simplistic processing elements may require substantially less physical space than a single standard processor and attendant memory (such as the cache 226), for example.

Figure 5:
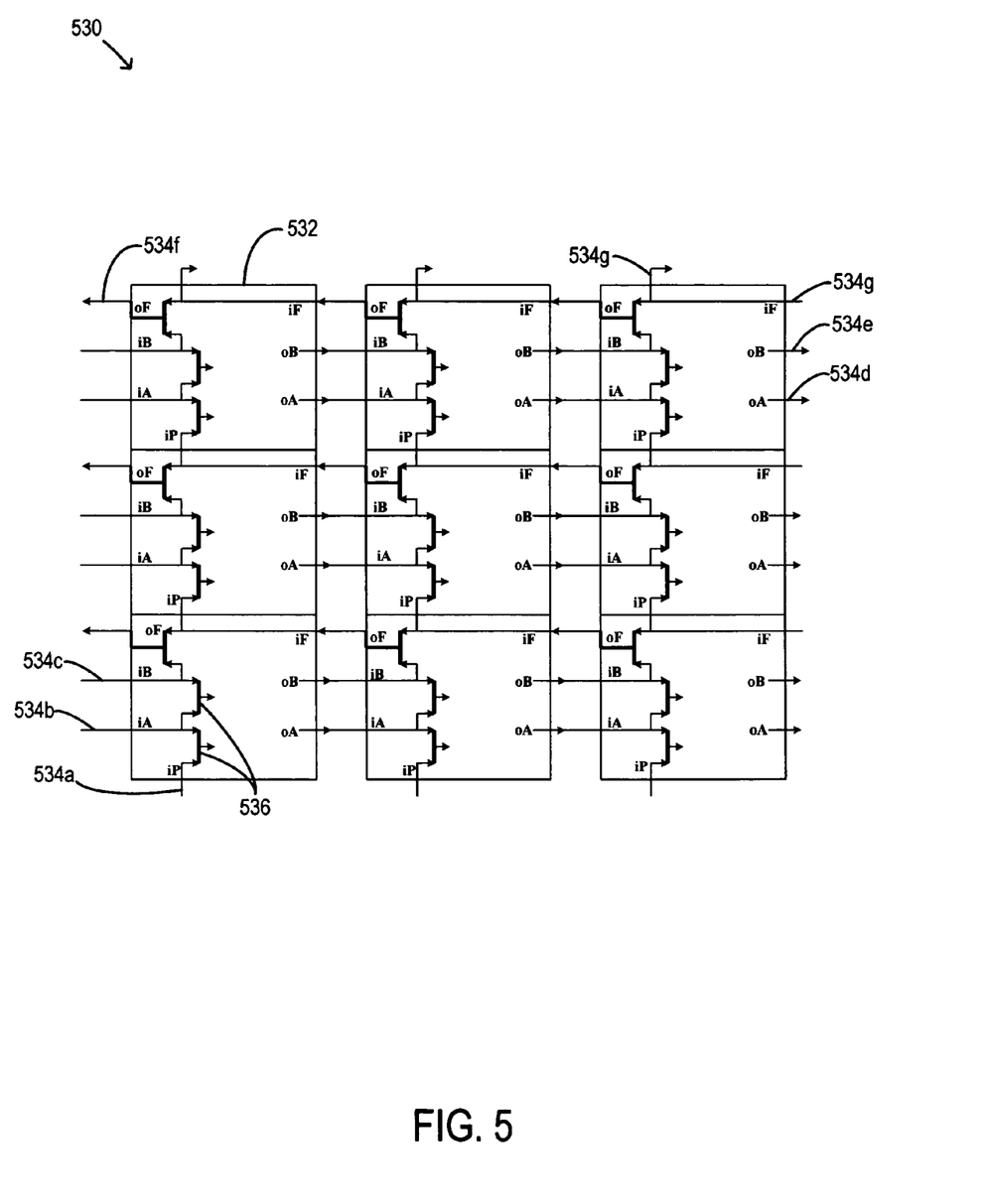
FIG. 5 is a block diagram of a matrix of processing elements according to some embodiments.

Referring to FIG. 5, a block diagram of a matrix of processing elements 530, according to some embodiments is shown. In some embodiments, the matrix of processing elements 530 may be similar in functionality and/or configuration to the matrix of processing elements 330 described in conjunction with FIG. 3. The matrix of processing elements 530 may, for example, comprise a plurality of groups of processing elements 532 coupled via a plurality of data flow paths 534. Although nine groups of processing elements 532 are shown in FIG. 5 for simplicity, any number of groups of processing elements 532 that is or becomes desirable may be included in the matrix of processing elements 530 (e.g., only a portion of the matrix of processing elements 530 may be shown in FIG. 5). According to some embodiments, the groups of processing elements 532 may represent, define, and/or comprise a plurality of individual processing elements or devices (not separately shown). Each group of processing elements 532 may, for example, comprise four processing elements (e.g., associated with the smallest desirable block dimensions N).

In some embodiments, the data flow paths 534 shown in FIG. 5 may be configured to load reference frame search window information into the matrix of processing elements 530. Data load paths 534a labeled "iP" for the bottom groups of processing elements 532 may, for example, comprise paths via which search window pixels are loaded from memory into the matrix of processing elements 530. The reference pixel information may continue to be loaded every clock cycle until each of the processing elements (e.g., each of the four processing elements) contains a reference pixel. Pixels may also and/or then be loaded via inter-element load paths 534b-c labeled "iA" and "iB", respectively. The inter-element load paths 534b-c may, for example, comprise search window pixels passed from inter-element output paths 534d-e labeled "oA" and "oB", respectively. According to some embodiments, reference pixels may also be piped back through the matrix of processing elements 530 via the final flow output and input paths 534f-g labeled "oF" and "iF", respectively. In some embodiments, the pixels loaded into adjacent groups of processing elements 532 may be offset (e.g., in raster and/or another order) such that each group of processing elements 532 contains reference window pixels associated with a single-pixel-offset position of a current block in the search window. In such a manner, for example, each pixel and/or each pixel for each possible block location in the search window may be loaded into the matrix of processing elements 530.

In some embodiments, the plurality of data flow paths 534a-g may also or alternatively be associated with a plurality of multiplexer selects 536. The multiplexer selects 536 (e.g., performed by various multiplexer devices not explicitly shown in FIG. 5) may, for example, manage, direct, and/or otherwise influence the flow of reference pixel information loaded into the matrix of processing elements 532. The multiplexer selects 536 may, according to some embodiments, facilitate and/or perform the offset of pixel information amongst the groups of processing elements 532. According to some embodiments, once the reference frame search window pixel information is loaded into the matrix of processing elements 530 (e.g., in accordance with the data flow paths 534a-g), the current block pixels may then be passed through the matrix of processing elements 530 (e.g., via data flow paths not necessarily shown in FIG. 5) to calculate mathematical deviations between compared current and reference pixels. These deviations may be accumulated and utilized to determine a best estimated motion vector for the current block. In some embodiments, the current block configuration may be changed and the current block information may be passed through the matrix of processing elements 530 again to determine a best estimated motion vector for the new block. According to some embodiments, the block size associated with the smallest deviations and/or with an average of the best estimated motion vectors may be selected as the best estimated block configuration for the current block.

Figure 6:
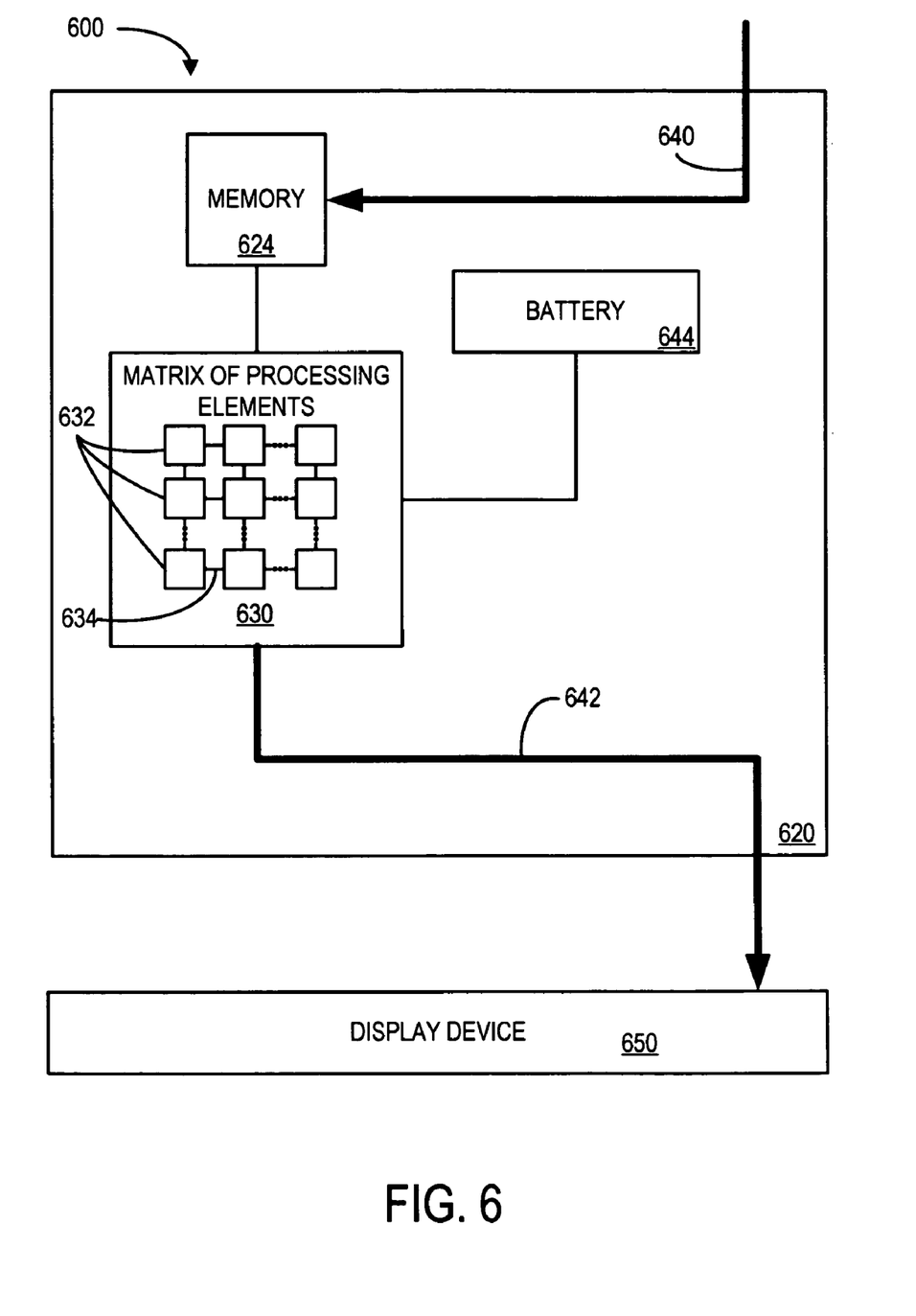
FIG. 6 is a block diagram of a system according to some embodiments.

Turning to FIG. 6, a block diagram of a system 600 according to some embodiments is shown. The system 600 may comprise, for example, an encoder 620. In some embodiments, the encoder 620 may be similar to the encoder 320 described herein. The encoder 620 may comprise, for example, a memory 624 and/or a matrix of processing elements 630. According to some embodiments, the matrix of processing elements 630 may comprise a plurality of groups of processing elements 632 coupled via a plurality of data flow paths 634. The system 600 may also comprise an input path 640, and output path 642, a battery 644, and/or a display device 650. According to some embodiments, the components 620, 624, 630, 632, 634, 650 of the system 600 may be similar in configuration and/or functionality to the similarly-named components described in conjunction with any of FIG. 3 and/or FIG. 5. In some embodiments, fewer or more components than are shown in FIG. 6 may be included in the system 600.

In some embodiments, the encoder 620 may be or include an MPEG-4 and/or other encoder coupled to receive image signals (e.g., digital image and/or digital video frames) via the input path 640. The encoder 620 may, for example, be a hardware encoder of the system 600 which may include a camcorder, digital camera, TV, DVD-player, and/or any other image recording, display, processing, and/or transmission device. According to some embodiments, the memory 624 may be or include one or more magnetic storage devices, such as hard disks, one or more optical storage devices, and/or solid state storage. The memory 624 may store, for example, image frames and/or image frame information associated with digital video images and/or image sequences. The memory 624 may comprise, according to some embodiments, any type of memory for storing data or image frames, such as a Single Data Rate Random Access Memory (SDR-RAM), a Double Data Rate Random Access Memory (DDR-RAM), or a Programmable Read Only Memory (PROM).

In some embodiments, the battery 644 may supply power to the matrix of processing elements 630 and/or otherwise to the encoder 620 or the system 600. The battery 644 may, for example, be a rechargeable Lithium-ion (Li-ion), Nickel-Metal Hydride (NiMH), and/or Nickel-Cadmium (NiCad) battery of a portable platform or device. In some embodiments, the matrix of processing elements 630 may perform improved exhaustive motion estimation searches in accordance with embodiments described herein. Pixels from a search window of a reference image frame may be loaded from the memory 624, for example, into the processing elements 632 (e.g., via the data flow paths 634). Pixels from a block of pixels of a current frame may then, according to some embodiments, be piped through the processing elements 632 to compute SAD and/or other deviation metrics associated with comparing current and reference pixels. The best estimated motion vector for the current block may, for example, be determined based on the smallest deviation results. In such a manner, the motion vector (i.e., the motion estimation) may be derived utilizing a single load of the reference window information from the memory 624 (and without requiring other buffers or cache). According to some embodiments, the reference frame information along with an motion estimation information (e.g., motion vectors) may be transmitted via the output path 642 to the display device 650. The display device 650 may then, for example, utilize the motion estimation information to create and/or derive the current frame from the reference frame (e.g., allowing for transmission of compressed video images and/or otherwise facilitating the viewing of streaming video sequences).

The several embodiments described herein are solely for the purpose of illustration. Other embodiments may be practiced with modifications and alterations limited only by the claims.

What is claimed is:

1. A method, comprising:
    loading, by a matrix of processing elements, information associated with a window of pixels from memory into the matrix of processing elements, wherein the window of pixels is selected from a plurality of pixels associated with a reference frame;
    determining, by the matrix of processing elements, a current frame comprising a plurality of pixels;
    determining, by the matrix of processing elements, a first block of pixels from the plurality of pixels of the current frame;
    comparing, by the matrix of processing elements, each pixel of the first block of pixels to each corresponding pixel of the window of pixels by comparing the first block of pixels to portions of the window of pixels in an exhaustive manner, wherein the comparing comprises calculating a first deviation result for each pair of compared pixels and aggregating the first deviation results for each position of the first block of pixels in the window of pixels, and wherein the calculating is performed by the matrix of processing elements;
    determining, by the matrix of processing elements, the minimum of the aggregated first deviation results;
    determining, by the matrix of processing elements, a first estimated best motion vector for the first block of pixels based upon the minimum of the aggregated first deviation results; and
    transmitting, by the matrix of processing elements, reference frame information along with the first estimated best motion vector to facilitate a display of video images.

2. The method of claim 1, wherein the first block of pixels is defined by a first block size, further comprising:
    determining a second block of pixels from the plurality of pixels of the current frame, wherein the second block of pixels is defined by a second block size;
    comparing the second block of pixels to portions of the window of pixels in an exhaustive manner, wherein the comparing comprises calculating a second deviation result for each pair of compared pixels and aggregating the second deviation results for each position of the second block of pixels in the window of pixels, and wherein the calculating is performed by the matrix of processing elements;
    determining the minimum of the aggregated second deviation results; and
    determining a second estimated best motion vector for the second block of pixels based upon the minimum of the aggregated second deviation results.

3. The method of claim 2, further comprising:
    selecting the one of the first or second estimated best motion vectors that is associated with the smallest of the first and second aggregated deviation results; and
    associating the selected first or second estimated best motion vector with the respective first or second block of pixels that was utilized to determine the selected first or second estimated best motion vector.

4. The method of claim 2, wherein the comparing is performed without requiring the information associated with the window of pixels to be re-loaded from memory.

5. The method of claim 2, wherein the first block size comprises dimensions of at least one of four by four pixels, four by eight pixels, eight by four pixels, eight by eight pixels, eight by sixteen pixels, sixteen by eight pixels, or sixteen by sixteen pixels.

6. The method of claim 2, wherein the second block size comprises dimensions of at least one of four by four pixels, four by eight pixels, eight by four pixels, eight by eight pixels, eight by sixteen pixels, sixteen by eight pixels, or sixteen by sixteen pixels.

7. The method of claim 1, wherein the window of pixels is defined by a window size comprising dimensions of at least one of one hundred and twenty-eight by thirty-two pixels, one hundred and twenty-eight by sixty-four pixels, two hundred and fifty-six by one hundred and twenty-eight pixels, or one thousand by five hundred and twelve pixels.

8. The method of claim 1, wherein the current frame is defined by a current frame size comprising dimensions of one thousand nine hundred and twenty by one thousand and eighty pixels.

9. The method of claim 1, wherein the matrix of processing elements comprises a plurality of processing elements coupled via one or more data flow paths.

10. The method of claim 9, wherein the loading comprises:
loading information associated with each pixel of the window of pixels into at least one of the processing elements of the matrix of processing elements.

11. The method of claim 9, wherein the calculating comprises:
passing information associated with the first block of pixels through the one or more data flow paths associated with the matrix of processing elements.

12. The method of claim 9, wherein the one or more data flow paths are configured to
require only a single loading from memory of the information associated with the window of pixels to perform the comparing.

13. The method of claim 9, wherein the plurality of processing elements comprises about four thousand processing elements.

14. The method of claim 9, wherein the plurality of processing elements comprises processing elements only capable of performing simple mathematical operations.

15. The method of claim 9, wherein the plurality of processing elements define a portion of a central processing unit.

16. A system, comprising:
a memory to store information associated with a reference frame; and
a matrix of processing elements coupled to:
load, from the memory, information associated with a window of pixels selected from a plurality of pixels associated with the reference frame;
determine a current frame comprising a plurality of pixels;
determine a first block of pixels from the plurality of pixels of the current frame;
compare each pixel of the first block of pixels to each pixel of the window of pixels by comparing the first block of pixels to portions of the window of pixels in an exhaustive manner, wherein the comparing comprises calculating a first deviation result for each pair of compared pixels and aggregating the first deviation results for each position of the first block of pixels in the window of pixels;
determine the minimum of the aggregated first deviation results; and
determine a first estimated best motion vector for the first block of pixels based upon the minimum of the aggregated first deviation results.

17. The system of claim 16, wherein the first block of pixels is defined by a first block size, and wherein the matrix of processors is further coupled to:
determine a second block of pixels from the plurality of pixels of the current frame, wherein the second block of pixels is defined by a second block size;
comparing the second block of pixels to portions of the window of pixels in an exhaustive manner, wherein the comparing comprises calculating a second deviation result for each pair of compared pixels and aggregating the second deviation results for each position of the second block of pixels in the window of pixels;
determine the minimum of the aggregated second deviation results; and
determine a second estimated best motion vector for the second block of pixels based upon the minimum of the aggregated second deviation results.

18. The method of claim 16, wherein the matrix of processors comprises about four thousand processors.

19. The method of claim 16, wherein the matrix of processors comprises processors only capable of performing simple mathematical operations.

20. A system, comprising:
a double data rate memory to store information associated with a reference frame;
a matrix of processors coupled to:
load, from the memory, information associated with a window of pixels selected from a plurality of pixels associated with the reference frame;
determine a current frame comprising a plurality of pixels;
determine a first block of pixels from the plurality of pixels of the current frame;
compare each pixel of the first block of pixels to each pixel of the window of pixels by comparing the first block of pixels to portions of the window of pixels in an exhaustive manner, wherein the comparing comprises calculating a first deviation result for each pair of compared pixels and aggregating the first deviation results for each position of the first block of pixels in the window of pixels;
determine the minimum of the aggregated first deviation results; and
determine a first estimated best motion vector for the first block of pixels based upon the minimum of the aggregated first deviation results; and
a battery to provide power to the matrix of processors.

21. The system of claim 20, wherein processors of the matrix of processors are electrically coupled to load the information associated with the window of pixels within the matrix of processors and to pass information associated with the first block of pixels amongst the processors to calculate and aggregate the first deviation results.

22. The system of claim 20 wherein the matrix of processors comprises thousands of simple computational devices.

* * * * *